Feb. 25, 1936.  E. F. W. KEIHL, JR  2,032,285

BALE TIE

Filed May 3, 1934

Inventor
Ernest F. W. Keihl Jr.
By
Attorney

Patented Feb. 25, 1936

2,032,285

UNITED STATES PATENT OFFICE 2,032,285

BALE TIE

Ernest F. W. Keihl, Jr., Medina, N. Y., assignor of one-half to Bertram W. O'Donnell, Medina, N. Y.

Application May 3, 1934, Serial No. 723,788

5 Claims. (Cl. 24—27)

This invention relates to bale ties.

In baling hay the bale ties are placed more or less loosely around the bale while the latter is in the press and as the bale of hay leaves the press it expands and effects tighting of the locking connection between the ends of the bale ties. With the bale ties now in use, the looped and hooked ends twist or turn, one on the other, with the result that the locked connection breaks, incident to wear, due to strain and frictional twisting movement of the locked ends, and oftentimes the looped and hooked ends move longitudinally relatively to each other to various angles and the hooked end slips accidentally through the looped end of the tie.

It is therefore one object of the present invention to provide a bale tie, embodying among other characteristics, a strong and durable hook and loop connection between the ends of the bale tie which provides for an easy and ready coupling connection between the looped and hooked ends of the tie, but which connection, once effected, by the use of the present invention, and irrespective of a turning relative movement of the loop and hook with relation to each other, the ends of the tie are not liable to breakage incident to wear due to friction and are prevented from becoming accidentally disconnected.

Another object of the invention is to provide a bale tie provided at one end with an open loop to receive a two-ply hook or a hook of double thickness or ply and formed to provide a hook having a restricted loop receiving portion into which the loop is adapted to snap and which is also formed to provide a brace portion or strut adapted to brace the hook portion and prevent bending of the hook portion and thereby obviate possibility of accidental disconnection of the hooked ends of the tie incident to accidental backward bending of the hook.

With these and other objects in view, the invention consists in the construction and novel combination and arrangement of parts hereinafter described, illustrated in the accompanying drawing, and set forth in the claims hereto appended, it being understood that various changes in the form, proportion, size and minor details of construction, within the scope of the claims, may be resorted to without departing from the spirit of the invention or sacrificing any of the advantages thereof.

Figure 1:
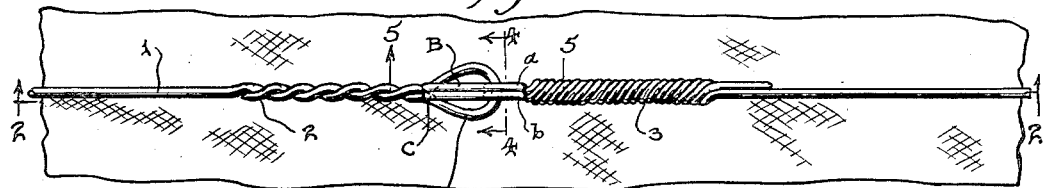
Figure 1 is a top plan view, showing the invention applied to a bale of hay.

Referring now more particularly to the accompanying drawing, in which several embodiments of the invention are illustrated, the reference character 1 indicates a wire or other bale tie provided at one end with a loop A and at the opposite end provided with a double ply hook B composed of two symmetrical or similarly formed members $a$ and $b$ arranged side by side in parallelism and which may be arranged in slightly spaced relation, if desired.

To form the loop A, the wire 1 is bent back upon itself with the backwardly bent portion 2 of the wire twisted in any common manner upon the wire 1, as shown.

The members $a$ and $b$ of the double ply hook B, each consist of a front loop C and an upper rear longitudinal loop D and a rear lower double ply shank E. The front loop C of each member $a$ and $b$ has upper and lower relatively straight contiguous portions 4 and 5 and a bend 6 connects the front ends of said straight side portions 4 and 5.

The rear upper loop D of each member $a$ and $b$ forms the bill of the hook, and this upper rear loop D of each member $a$ and $b$ has upper and lower sides 8 and 9 and a connecting bend 10, the lower sides 9 of the upper rear loop D cooperating with the shank portions E to form the throat 11 of the hook.

The lower portions 9 of the upper rear loop are reversely curved, as illustrated, to restrict the mouth or entrance of the throat 11 of the hook so that the open loop A may be snapped into engagement with the bill of the hook between the lower portions 9 of the upper rear loop and the shank E and be detachably locked in the hook.

Figure 6:
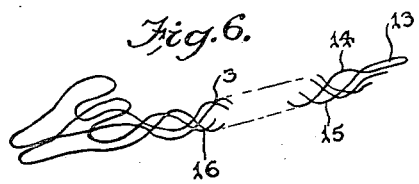
Fig. 6 is a diagrammatic view showing one manner or method of forming the hooked end of the fastener.

The hook B may be formed at one end of the wire 1 in various ways but one way in which the formation of the double ply hook, double ply brace and double ply shank may be accomplished is to bend one end of the tie backwardly upon itself, as at 3, and the portions of the member a then formed. The bent back portion 3 of the wire 1 is continued a distance along the wire 1 and bent at 13 and then directed forwardly, as at 14, (see Fig. 6), and the outer end of the portion 14 is then bent to form the companion member b for side by side relation with the aforesaid member a to provide for the two ply or double thickness of hook with the part 15 of the wire disposed in parallelism with the body portion of the tie 1. The bent back portions 3 and 14 are now twisted as at 16 (Fig. 6) in any suitable manner, tightly with the portion 15 and the body of the tie 1 with the extremity of the portion 15 (Fig. 6) terminating at 16 short of the bight 13 (Fig. 6) of the twisted portions 3 and 14. The result is a substantial twisted connection between the hook B and the wire 1 and the formation of a double ply hook, brace, bill and shank possessing such strength and such other characteristics as to provide for a strong hook not liable to bending under twisting actions or longitudinal strains placed on the bale tie in the handling of the tied bale.

The front and rear loops C and D, respectively, are connected together at their upper portions by reason of the upper members of the front and rear loops extending into each other. The result is that these upper portions of these loops which extend into each other provide a double ply brace or strut $8^\times$. The outer end of the lower loop C bears against the bale tie slightly beyond the inner side of the open loop A and said connecting portions between the front and rear loops and the front loop, by reason of the front loop bearing against the bale tie as stated effects such a bracing action on the bill of the hook as to prevent backward bending of the bill of the hook incident to strains thereon when the open loop A is in operative locked relation with the hook. By bracing the hook and preventing backward bending thereof the hook is prevented from accidentally slipping through the loop A and unfastening the tie.

The lower side by side portions of the front loop are directed inwardly, as at $x$ between the front and rear loops C and D and when the device is assembled these inwardly directed portions $x$ pass through said open loop and preferably bear against the back of the seat $y$ into which seat $y$ the outer end of the open loop A is snapped through the restricted throat 11. These inwardly directed portions $x$ of the lower member of the front loop C brace the aforesaid brace or strut $8^\times$ intermediate the ends of the latter to assist in preventing accidental backward bending of the bill of the hook, and by reason of the engagement of said inwardly directed portions $x$ with the back of the seat $y$, the back of said seat is reinforced by the portions $x$ to prevent the rear loop D and the consequently formed hook from being sheared off incident to strains longitudinally or otherwise of the open loop A on said seat. It will thus be seen that the brace portions $x$ perform the dual function of bracing the bracing connection $8^\times$ between the front and rear loops to prevent backward bending of the hook of the rear loop and also reinforcing the open loop seat $y$ so as to prevent shearing of the hook or the front and rear loops from the tie incident to strains due to longitudinal or other stresses of the loop A on the hook.

Figure 2:
Fig. 2 is a sectional view on the line 2—2 of Fig. 1.
Figure 3:
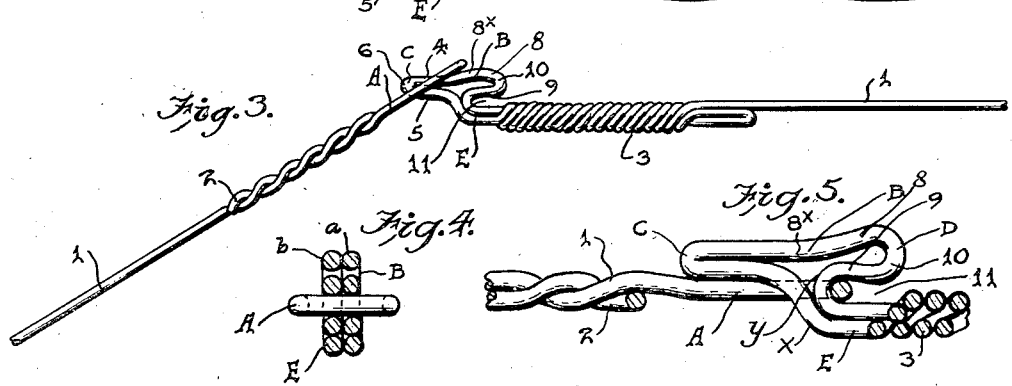
Fig. 3 is a view showing the tie fastener partly assembled.
Figure 4:
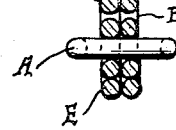
Fig. 4 is an enlarged transverse sectional view on the line 4—4 of Fig. 1.
Figure 5:
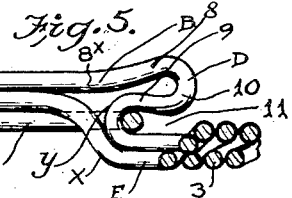
Fig. 5 is an enlarged longitudinal sectional view on the line 5—5 of Fig. 1.

To connect the ends of the bale tie together, the hooked end of the tie is disposed at substantially a right angle to the open side of the open loop, from either side of the loop, and passed through the loop, as shown in Fig. 3 of the drawing. The ends of the tie are then brought substantially into alignment, and either or both ends of the tie are then drawn up by the expanding bale or otherwise, when the outer end of the loop A will snap into the bill of the hook and be seated in said seat through the restricted throat 11 to occupy the operative position shown in Figs. 1, 2 and 5 with the outer end of the front loop bearing against the exterior of the bale tie adjacent the inner end of the open loop and the bill of the hook firmly held by the brace or strut $8^\times$ against outward flexing or bending and the open loop thereby securely confined in its snapped engagement with the hook.

Figure 9:
Figs. 9 and 10 illustrate a third form of the invention.
Figure 10:

As shown in Figs. 9 and 10, the bale tie locking means may be of single rather than double ply, and in this embodiment of the invention, the loop A' is formed at one end of the tie 1' as in the form first described. The hook B' is the same in formation and shape and coacts with the loop A' in the same manner as in the form previously described, but owing to the single ply type of hook, in this instance, the hook B' is formed by merely bending back the respective end of the tie 1' and shaping and forming the hook and its associated parts and then twisting the extremity 2' on to the body of the tie 1'.

In this embodiment of the invention there is the same snapping engagement of the loop A' with the bill of the hook B' and the bracing of the hook, but, of course, the strength of the hook B' in this second form of the invention, is not as great as is the strength of the first form described but under certain conditions this second type of bale tie fastening means may serve useful purposes.

Figure 7:
Figs. 7 and 8 illustrate a modification.
Figure 8:
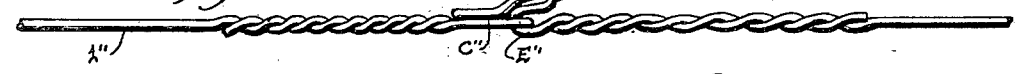

There is illustrated in Figs. 7 and 8 a third embodiment of the invention wherein is disclosed a double ply hook B'' which is of different form than the double ply type of hook B. In this third form of bale tie fastener the hook B'' includes similarly formed spaced members a' and b' including the upper rear loop D'' and the shank E'' and the front loop C'' of double ply is disposed horizontally. As in the other described forms of the invention, the loop A'' is adapted to snap into the hook and the front loop C'' is adapted to engage the tie adjacent the loop A'' to brace the bill of the hook from flexing or bending incident to strains or relative twisting actions of the hook and open loop A''. This third form of hook may be formed in any suitable manner to provide for the double ply hook, brace and shank, and the hooked extremity of the tie 1'' is twisted on to the body of the tie wire 1'' as shown and in any suitable manner.

I claim:

1. A bale tie comprising a wire provided at one end with an open loop and at its opposite end provided with two similarly formed oppositely disposed members arranged in side by side relation and each including a front brace portion of loop form including upper and lower side members arranged in horizontal relation with respect to the side members of the front loop of the opposite similarly formed member and a rear upper loop forming upper and lower side members corresponding to the upper and lower side members of the upper rear loop of the opposite similarly formed member to form the bill of the hook, each of said similarly formed members having a shank portion extending rearwardly from substantially the middle of said hook in side by side relation, the lower side members of the upper rear loop being curved and cooperating with said shank portions to provide a restricted throat for the hook to receive said open loop and holding the outer end of the open loop between the same substantially intermediate the ends of the hook, the front brace portions of the hook lying on the bale tie adjacent the loop to brace the bill of the hook against accidental bending when the tie is operatively bound about the bale.

2. A bale tie comprising a wire provided at one end with an open loop and at its opposite end provided with a hook including a front loop and a rear loop, the latter loop forming the bill of the hook and each loop including upper and lower members and the upper members extending from one loop to the other and being slightly directed inwardly intermediate its ends to form a brace, the lower member of the front loop of the hook being curved downwardly and rearwardly through said open loop and engaging the aforesaid brace to prevent accidental withdrawal of the hook through said open loop and cooperating with a rearwardly extending portion of the lower member of said rear loop to provide a shank to cooperate with said bill to provide a throat for the reception of said open loop, said bill being curved toward said shank to restrict said throat for a snapping of the open loop into said throat to lock the open loop in the hook.

3. A bale tie comprising a wire provided at one end with an open loop and at its opposite end provided with a hook composed of a front loop and a rear loop, the latter loop forming the bill of the hook end including a pair of members each including upper and lower portions, with the upper portions directed inwardly and thence forwardly into the front loop to provide a double ply brace between said front and rear loops, the lower members of said rear loop being directed under the lower portions of the rear loop to provide a shank portion for cooperation with the bill of the hook to provide a throat for the reception of said open loop, said bill being directed toward said shank to restrict said throat for a snapping of the open loop into said throat to lock the open loop in the hook, the said front loop portion of the hook lying on the inner portion of said open loop when the latter is snapped into said restricted throat.

4. A bale or like tie comprising a wire provided at one end with an open loop and at its opposite end provided with a hook composed of a front loop and a rear loop, and a shank, the rear loop including upper and lower members and constituting the bill of the hook, the lower member of the bill being curved inwardly and outwardly with respect to the shank to provide a restricted throat and a seat through which throat the open loop is snapped into said seat to lock the hook in said open loop including upper and lower members, said front loop extending slightly inwardly beyond the inner side of said open loop when the hook is operatively inserted in said open loop and the upper members of said front and rear loops connecting the same together and forming a brace for the bill of the rear hook, the lower member of said front loop being directed into engagement with said brace intermediate the ends of the latter and thence directed inwardly into engagement with the back of said loop to reinforce said seat and connected to the tie and thereby prevent backward bending of said bill incident to strains thereon by said open loop, and preventing accidental withdrawal of the hook through the open loop and also preventing shearing off of the bill of the hook incident to strains on said seat by said open loop.

5. A bale or like tie comprising a wire provided at one end with an open loop and at its opposite end provided with a hook composed of a front loop and a rear loop, and a shank, the rear loop including upper and lower members and constituting the bill of the hook, the lower member being reversely curved to provide a seat, and with said shank providing a restricted throat through which latter said open loop is snapped into said seat to lock the hook in said open loop, said front loop including upper and lower members extending slightly beyond the inner side of the open loop onto the body of the tie when said hook is operatively associated with the open loop and the upper members of said front and rear loops connecting the same together and forming a brace for the bill of the hook, the lower member of said front loop being curved inwardly from engagement with said brace and directed through said open loop into engagement with the back of said seat to reinforce said brace and the back of said seat to prevent backward bending of the bill of the hook and thereby prevent accidental slipping of said hook through said open loop and also prevent a shearing off of the bill of the loop at said seat.

ERNEST F. W. KEIHL, Jr.

CERTIFICATE OF CORRECTION.

Patent No. 2,032,285. February 25, 1936.

ERNEST F. W. KEIHL, JR.

It is hereby certified that error appears in the printed specification of the above numbered patent requiring correction as follows: Page 1, first column, line 5, for "tighting" read tightening; same page, second column, line 30, for "consist" read consists; page 3, first column, line 35, claim 3, for "end" read and; and second column, line 8-9, claim 4, strike out the words "including upper and lower members" and insert the same after "loop" in line 9; and that the said Letters Patent should be read with these corrections therein that the same may conform to the record of the case in the Patent Office.

Signed and sealed this 7th day of April, A. D. 1936.

Leslie Frazer (Seal) Acting Commissioner of Patents.